(12) United States Patent
Pentek et al.

(10) Patent No.: US 10,360,932 B2
(45) Date of Patent: Jul. 23, 2019

(54) HEAT ASSISTED MAGNETIC DATA RECORDING HEAD WITH HEAT SINK

(71) Applicant: Western Digital Technologies, Inc., Irvine, CA (US)

(72) Inventors: Aron Pentek, San Jose, CA (US); Takuya Matsumoto, Sunnyvale, CA (US); Venkata R K Gorantla, Dublin, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 325 days.

(21) Appl. No.: 15/369,730

(22) Filed: Dec. 5, 2016

(65) Prior Publication Data

US 2018/0158474 A1 Jun. 7, 2018

(51) Int. Cl.
| | |
|---|---|
| *G11B 5/31* | (2006.01) |
| *C25D 7/00* | (2006.01) |
| *C25D 5/02* | (2006.01) |
| *C25D 5/48* | (2006.01) |
| *G11B 5/00* | (2006.01) |

(52) U.S. Cl.
CPC ............ *G11B 5/3169* (2013.01); *C25D 5/022* (2013.01); *C25D 5/48* (2013.01); *C25D 7/001* (2013.01); *G11B 5/3133* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,339,740 B2 | 12/2012 | Zou et al. | |
| 8,477,572 B1 | 7/2013 | Sahoo et al. | |
| 8,721,902 B1 | 5/2014 | Wang et al. | |
| 8,995,088 B1* | 3/2015 | Boone | G11B 5/3146 360/125.32 |
| 9,064,515 B2 | 6/2015 | Zhao et al. | |
| 9,135,930 B1 | 9/2015 | Zeng et al. | |
| 9,202,479 B1 | 12/2015 | Wessel et al. | |
| 9,230,572 B2 | 1/2016 | Balamane et al. | |
| 2002/0132137 A1* | 9/2002 | Kawasaki | C25D 3/562 428/815 |
| 2008/0232000 A1* | 9/2008 | Flint | G11B 5/112 360/319 |

(Continued)

OTHER PUBLICATIONS

Bhargava, S. et al., "Lowering HAMR Near-Field Transducer Temperature via Inverse Electromagnetic Design," IEEE Transactions on Magnetics, vol. 51, No. 4, Apr. 2015, pp. 1-7.

*Primary Examiner* — Stefanie S Wittenberg
(74) *Attorney, Agent, or Firm* — Foley & Lardner LLP

(57) ABSTRACT

A method for manufacturing a magnetic write head having a heat sink structure, wherein the magnetic write head is free of voids at the media facing surface. After forming the write pole, a chemical mechanical polishing process is performed prior to defining the heat sink structure. Planarizing the write pole structure by chemical mechanical polishing prior to forming the heat sink structure advantageously reduces the topography over which the heat sink structure. This mitigates shadowing effects from the write pole structure and prevents the formation of voids at the media facing surface.

19 Claims, 18 Drawing Sheets

(56) References Cited

U.S. PATENT DOCUMENTS

| | | | | |
|---|---|---|---|---|
| 2009/0283205 A1* | 11/2009 | Miyazawa | ............ | G11B 5/1278 |
| | | | | 156/154 |
| 2010/0321835 A1* | 12/2010 | Zhang | ................... | G11B 5/3116 |
| | | | | 360/319 |
| 2011/0011744 A1* | 1/2011 | Chen | ...................... | C25D 5/022 |
| | | | | 205/85 |
| 2011/0042349 A1* | 2/2011 | Zhou | ...................... | G11B 5/855 |
| | | | | 216/22 |
| 2013/0019467 A1* | 1/2013 | Zhang | ................... | G11B 5/3116 |
| | | | | 29/603.07 |
| 2015/0092525 A1 | 4/2015 | Araki et al. | | |

* cited by examiner

HEAT ASSISTED MAGNETIC DATA RECORDING HEAD WITH HEAT SINK

FIELD OF THE INVENTION

The present invention relates to magnetic data recording, and more specifically to a heat assisted magnetic recording (HAMR) system having a void-free heat sink structure adjacent to a write pole.

BACKGROUND

Modern day information is commonly stored in magnetic disk drives that include a rotating magnetic disk and a slider containing one or more magnetic head assemblies that house read and write heads that are suspended over the disk by a swinging suspension arm. When the disk rotates, air flows underneath the slider and causes it to lift off and 'fly' over the surface of the rotating disk, allowing for the magnetic heads to be employed via processing circuitry to read and write magnetic impressions to and from the rotating disk.

The write head includes at least one coil, a write pole, and one or more return poles. When current flows through the coil, it induces a magnetic field that emanates from the write pole into the disk. The magnetic field is sufficiently strong that it locally magnetizes a portion of the magnetic media, thus allowing for data bits to be recorded onto the disk. After passing through the magnetic layer, the magnetic field travels through the rest of the disk and completes its path by returning to the return pole of the write head.

Once a data bit is recorded onto the disk, its magnetic state can be read with a magnetoresistive sensor, such as giant magnetoresistive (GMR) or a tunnel junction magnetoresistive (TMR) sensor that has a measurable electrical resistance that changes in response to the magnetic field state of the recorded data bit.

This read/write method is the recording technique typically implemented in conventional perpendicular magnetic recording (PMR). However, as data density needs increase and data bits are made smaller and packed closer together, they become thermally unstable and prone to demagnetization. One way to circumvent this problem is to make the recording media more magnetically stiff, i.e., have a higher magnetic anisotropy. However, 'stiffer' media also require higher recording magnetic fields, something which is in itself a limitation since in order to record smaller data bits, the pole size also needs to be reduced, and this in turn reduces the strength of the magnetic field that can be delivered to the disk.

A solution to this challenge is to use heat assisted magnetic recording (HAMR) in which data bits are defined by locally heating the media through the use of a near field thermal transducer (NFT) just at the location on the disk that is to be recorded. The heating process temporarily lowers the magnetic anisotropy of the media, thus 'softening' it and allowing it to be recorded with the write pole at write fields that would otherwise be too weak to induce magnetization. Then, after the data has been written, as the disk spins past the NFT, the media cools, causing the anisotropy of the media to rise again, thereby ensuring that the media 'freezes in' the magnetic state of the recorded data bit.

SUMMARY

One embodiment of the present invention provides a method for manufacturing a magnetic write head having a heat sink structure. The method includes forming a magnetic write pole over a substrate, the write pole having first and second sides. A non-magnetic fill material is deposited, and a chemical mechanical polishing process is performed. After performing the chemical mechanical polishing, a non-magnetic heat sink structure is formed so as to extend from the sides of the magnetic write pole.

The process advantageously forms a magnetic write pole and heat sink structure in a magnetic write head that is free of voids at the media facing surface. This advantage can be realized by planarizing the write pole structure by chemical mechanical polishing prior to defining the heat sink structure. This allows the heat sink structure to be formed over a lower topography than would be the case over the as-deposited write pole, thereby minimizing shadowing effects from the write pole structure.

These and other features and advantages of the invention will become apparent upon reading of the following detailed description of the embodiments taken in conjunction with the figures in which consistent reference numbering is used to indicate similar elements throughout.

BRIEF DESCRIPTION OF THE DRAWINGS

For a fuller understanding of the nature and advantages of this invention, as well as to illustrate the preferred mode of use, reference should be made to the following detailed description, read in conjunction with the accompanying drawings, which for clarity are not drawn to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
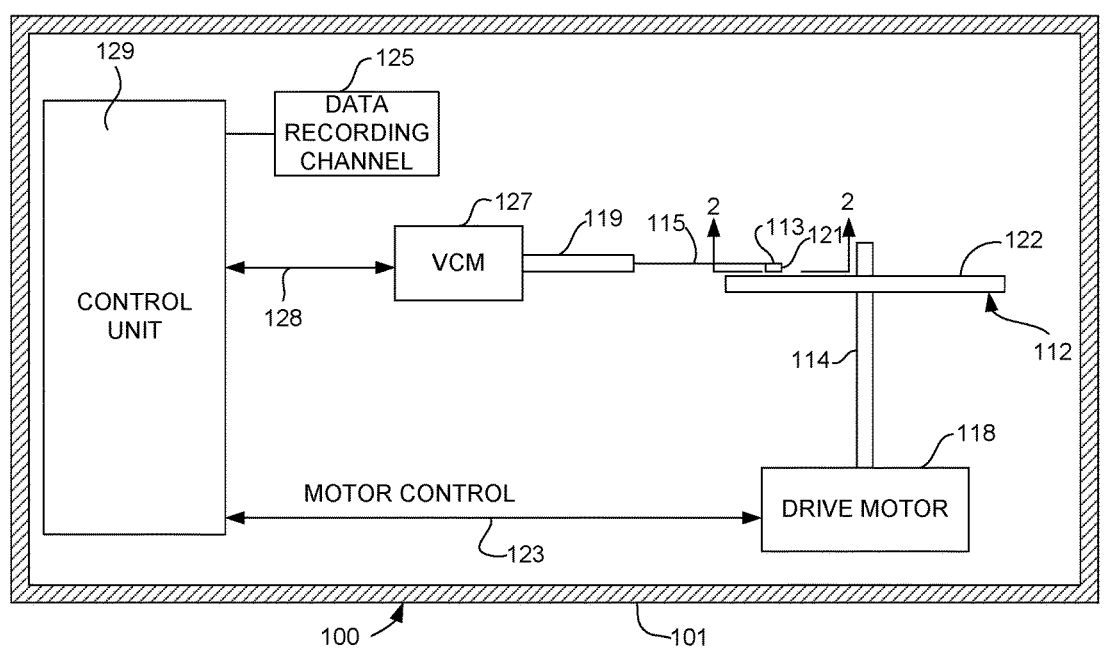
FIG. 1 is a schematic illustration of a disk drive system in which various embodiments of the invention might be embodied.

FIG. 1 shows a disk drive/disk storage system 100 along with its housing 101 containing at least one rotatable magnetic disk 112 that is supported on a spindle 114 and rotated by a disk drive motor 118. The magnetic recording pattern on each disk 112 may be in the form of annular patterns of concentric data tracks (not shown).

At least one slider 113 is positioned near the magnetic disk 112, with each slider 113 supporting one or more magnetic head assemblies 121. As the magnetic disk rotates, the slider 113 moves in and out over the disk surface 122 so that the head assembly 121 can access different tracks on the disk. Each slider 113 is attached to an actuator arm 119 by way of a suspension 115. The suspension 115 provides a slight spring force, which biases the slider 113 against the disk surface 122. Each actuator arm 119 is attached to an actuator means 127, which may be a voice coil motor (VCM) comprised of a coil that is movable according to a magnetic field. The direction and speed of the coil movement is controlled by the motor current signals supplied by the control unit 129.

During operation of the disk storage system, the rotation of the magnetic disk 112 generates an air bearing between the slider 113 and the disk surface 122, which exerts an upward force, or lift, on the slider. The air bearing thus counter-balances the slight spring force of the suspension 115 and supports the slider 113 off and slightly above the disk surface by a small, substantially constant spacing during normal operation conditions.

The various components of the disk storage system are controlled by access control and internal clock signals that are generated by a control unit 129, typically comprised of logic control circuits and a microprocessor. An aspect of the control unit 129 will be discussed below in greater detail with reference to FIG. 3. The control unit 129 generates control signals to control various system operations such as drive motor control signals on line 123 and head position and seek control signals on line 128. The control signals on line 128 move and position the slider 113 to the desired data track on the media 112. Write and read signals are communicated to and from the write and read heads 121 by way of a recording channel 125. An aspect of the control unit 129 will be discussed below in greater detail with reference to FIG. 3.

Figure 2:
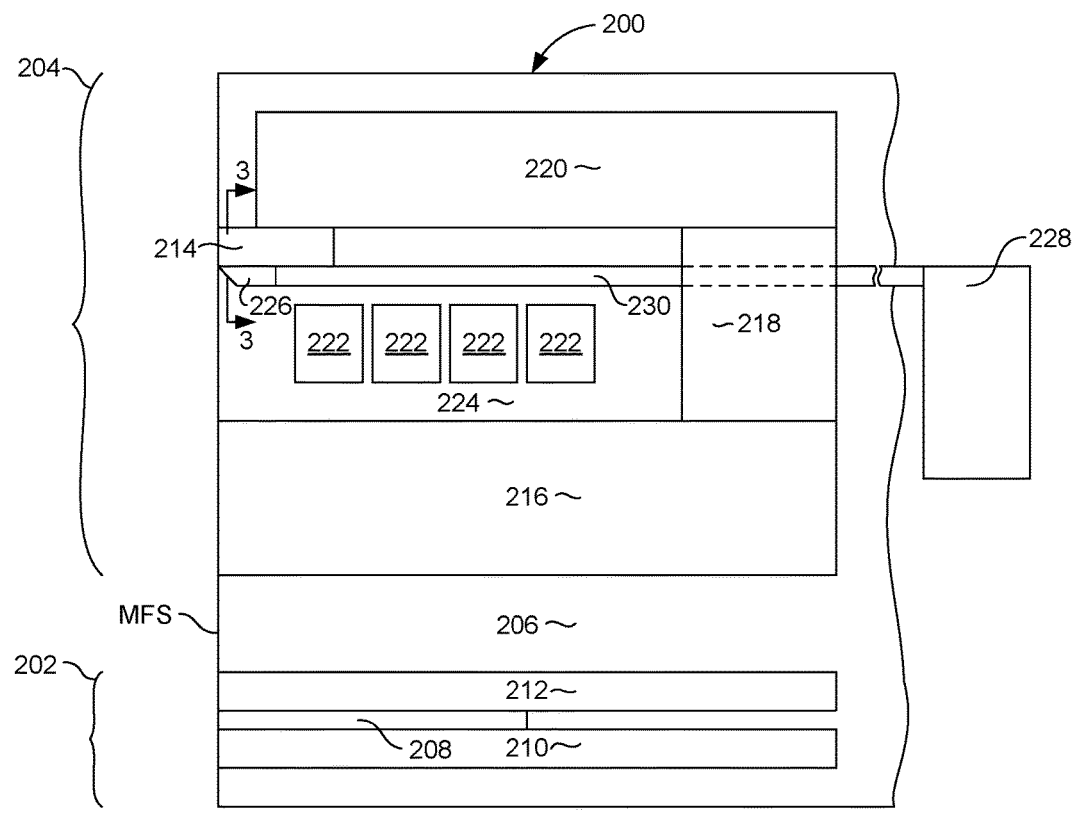
FIG. 2 is a side cross-sectional view of a magnetic read/write head for use in a magnetic data recording system.

FIG. 2 shows a cross sectional side view of a sample magnetic read/write head 200 that incorporates a near field transducer for use in heat assisted magnetic recording. The orientation of FIG. 2 is from line 2-2 of FIG. 1. The read/write head 200 includes a magnetic read element 202 and a magnetic write element 204, both of which can be embedded in an insulating fill material 206 such as alumina. The read element includes a magnetoresistive sensor 208 that can be placed in between first and second magnetic shields 210, 212.

The write element 204 includes a magnetic write pole 214, and a magnetic return pole 216, both of which extend out to the media facing surface (MFS) of the head. The write pole 214 is connected to a main pole structure 220 that connects to the return pole 216 via a back gap structure 218.

An electrically conductive, non-magnetic write coil 222, shown in cross section in FIG. 2, passes through the write element 204. The write coil 222 can be constructed of a material such as Cu. The write coil can be embedded in a non-magnetic, electrically insulating layer 224 such as alumina. When an electrical current passes through the write coil 222, a magnetic field is generated that is delivered to the disk via the write pole 214. In conventional perpendicular magnetic recording (PMR), this magnetic field is strong enough to magnetize the media, thus allowing recording to occur. The magnetic field then flows through the rest of the disk, and completes its path by returning to the return pole 216. Because the return pole 216 has a much larger area at the media facing surface MFS than does the write pole 214, the returning magnetic field strength is sufficiently weak that it does not erase any previously recorded data on the disk.

However, as data density needs increase, the size of the write pole is decreased and data bits are made smaller and packed closer together until they become thermally unstable and prone to demagnetization. One way to circumvent this problem is to construct the magnetic media of a higher anisotropy magnetic material. However, while this makes the magnetic media more stable, it also causes it to require stronger recording magnetic write fields, a problem that is exacerbated by the fact that smaller write poles output a weaker magnetic field, thus making it difficult for recording to occur.

This challenge can be overcome by the use of heat assisted magnetic recording (HAMR) in which highly anisotropic magnetic media is locally heated to temporarily lower its anisotropy, thus allowing for magnetic recording to occur. Then, as the disk moves past the hotspot, the media cools, and its anisotropy again increases, thus ensuring the magnetic stability of the recorded data on the disk.

To this end, the magnetic write element 204 can include a near field transducer (NFT) 226 that extends to the media facing surface (MFS) at a location adjacent to the leading edge of the write pole 214. The near field transducer is optically connected with a light source, such as a laser 228 that can be located at the backside of the slider on which the magnetic head 200 is formed. The light from the laser 228 can be delivered to the near field transducer via the use of an optical waveguide element 230.

Figure 3:
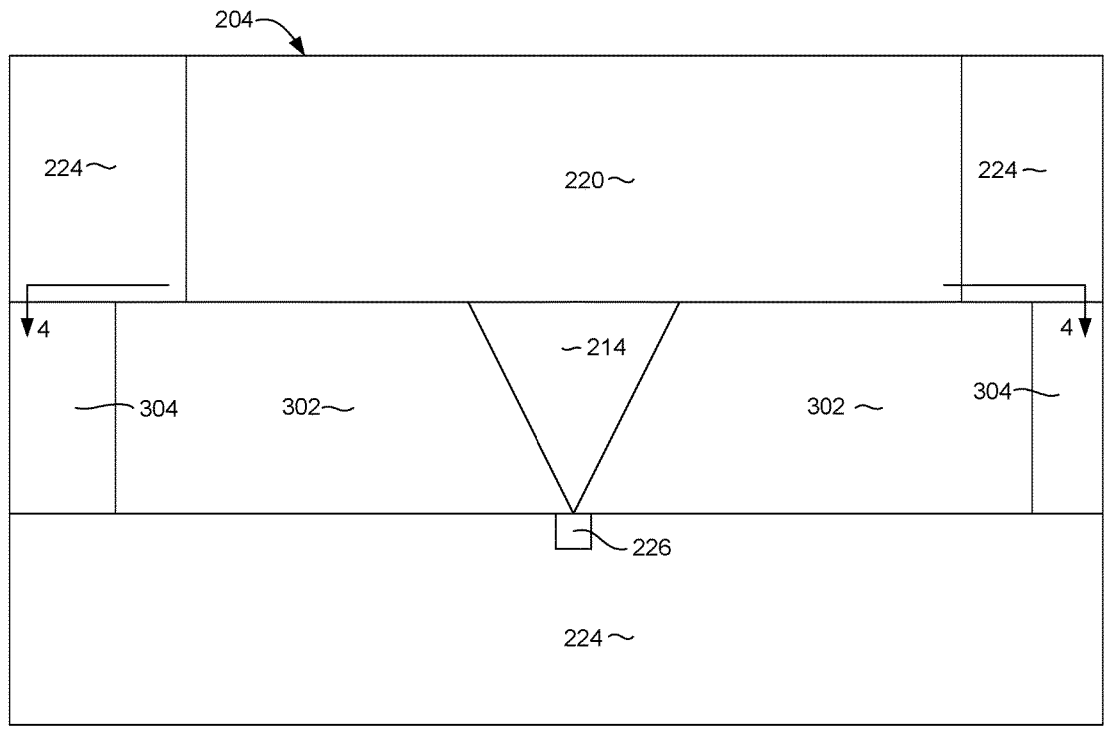
FIG. 3 is an enlarged view of a portion of a magnetic write head as seen from the media facing surface according to one embodiment.
Figure 4:
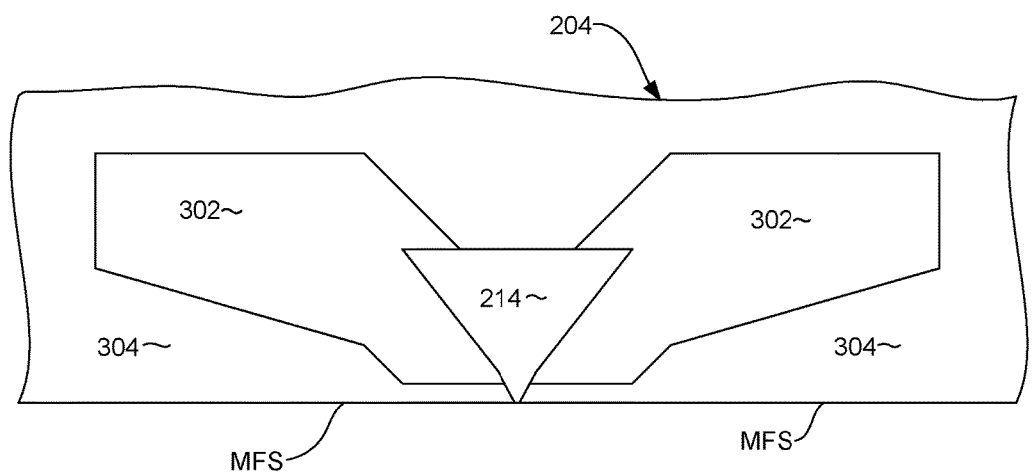
FIG. 4 is a top-down view of the write head as seen from line 4-4 of FIG. 3.

FIG. 3 shows an enlarged view of the magnetic write pole 214 and surrounding structure from a plane parallel with the media facing surface (MFS) as taken from line 3-3 of FIG. 2, in accordance with one embodiment. As seen in FIG. 3, the write pole can have a triangular (or trapezoidal) cross-section. The near field transducer (NFT) 226 can be located at the leading edge of the write pole 214. As will be appreciated, the use of the near field transducer (NFT) produces heat, which heats up the write pole 214. Excessive heating can damage the write pole 214, thereby resulting in failure of the write head 204 and/or performance degradation. Therefore, in order to prevent this excessive heating, the write head 204 can be provided with a heat sink structure 302 that can be formed adjacent to the sides of the write pole 214. In one embodiment, the heat sink structure 302 is formed of a non-magnetic material having a high thermal conductivity such as Cu or Au. In one embodiment, the area beyond the heat sink structure 302 is filled with a non-magnetic fill material 304 such as alumina ($Al_2O_3$). FIG. 4 shows a top down view of the write pole 214 and heat sink structure 302 as seen from line 4-4 of FIG. 3. As can be seen in FIG. 4, the heat sink structure 302 is recessed, in one embodiment, from the media facing surface MFS, and can even extend behind the write pole 214 in a direction away from the media facing surface MFS. Recessing the heat sink structure 302 from the media facing surface MFS prevents the heat sink structure 302 from being exposed at the MFS, which could cause corrosion problems or wear problems. In one embodiment, the harder, more corrosion resistant fill material (e.g. alumina), rather than the heat sink, is exposed at the MFS.

One challenge that can arise from the construction of the heat sink structure 302, is that of voids being formed in the fill layer 304 at the MFS. This formation of voids can lead to corrosion and wear problems and can seriously shorten the life of the write head 204. The inventors have found that these voids are the result of forming the heat shield over a tall, non-planarized write pole structure 214 after defining the write pole. If the fill layer is deposited over these tall write pole and heat shield structures, shadowing from these structures causes problematic void formation in the fill layer 304 at the media facing surface. A process described herein below can, however, advantageously form the desired heat sink structure 302 while completely avoiding problematic void formation in the fill material 304.

Figure 5:
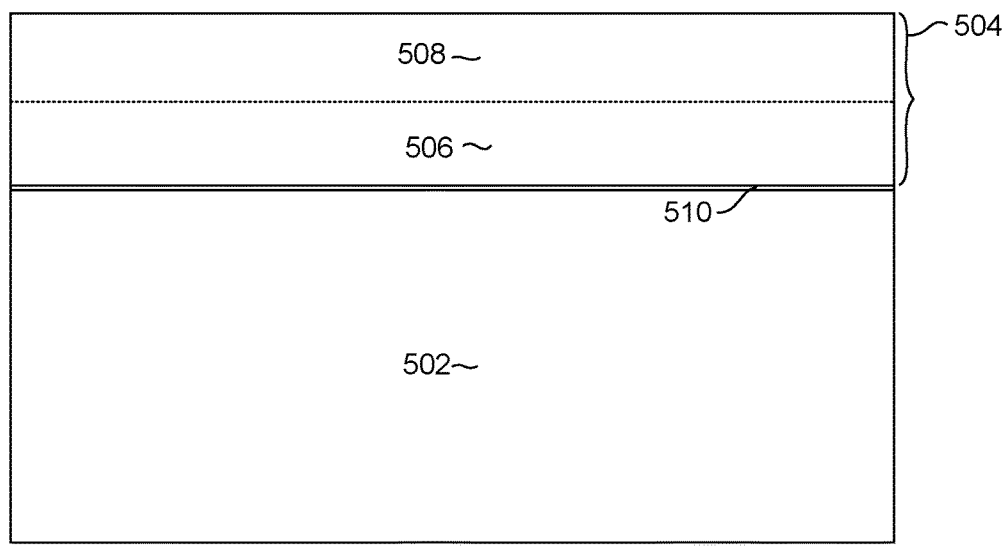
FIGS. 5-17 are views of a portion of a magnetic write head in various intermediate stages of manufacture illustrating a method of manufacturing a magnetic write head, according to various embodiments.

FIGS. 5-17 show a portion of a magnetic write head in various intermediate stages of manufacture in order to illustrate a method of manufacturing a void free magnetic write head structure with a heat sink structure, in accordance with various embodiments. With particular reference to FIG. 5, a substrate 502 is formed. This substrate 502 can be a material such as alumina (Al₂O₃) that has been planarized to have a smooth planar surface. A magnetic write pole material 504 is deposited over the substrate 502. The magnetic write pole material can be a bi-layer structure including first and second magnetic layers 506, 508. In addition, a seed layer 510 can be formed beneath the write pole material 504. The seed layer can be an electrically conductive magnetic material such as NiFe.

Figure 6:
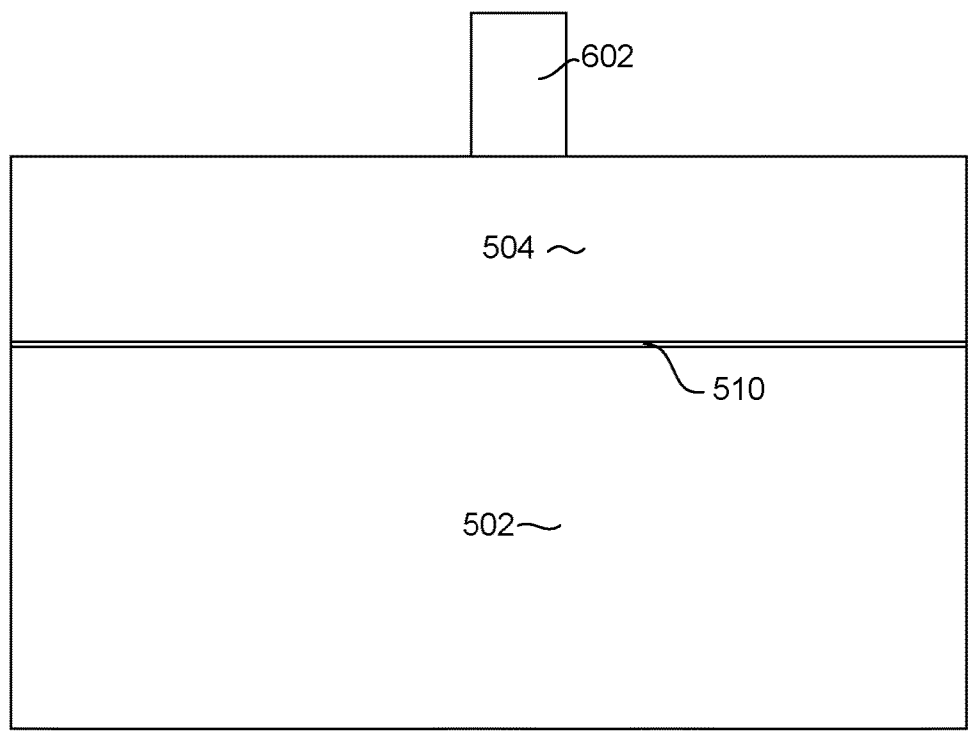

With reference to FIG. 6, a mask structure 602 can be formed over the magnetic write pole material 504. The mask 602 is configured in the shape of the desired write pole (such as shown in FIG. 4). Although FIG. 5 shows the write pole as being a bi-layer, subsequent figures will simply show the write pole material as a single layer 504 for purposes of simplicity. Optionally, the mask 602 can include a hard mask layer Cr and/or NiCr (not shown) formed beneath a patterned layer of photoresist. In that case, the hard mask would be deposited full film and then the photoresist layer would be patterned over the hard mask. The pattern of the photoresist mask would then be transferred to the underlying hard mask by ion milling, and the photoresist would be removed, leaving the patterned hard mask.

Figure 7:
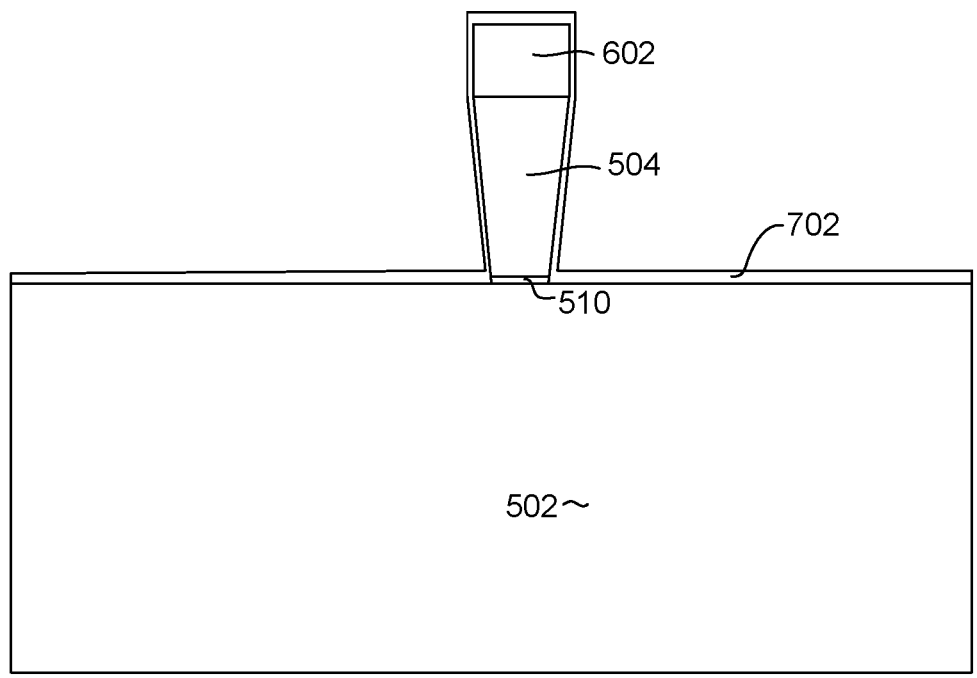

Then, an ion milling process can be performed to remove material not protected by the mask 602 so as to leave a write pole structure 504 as shown in FIG. 7. In addition to the write pole material 504, the seed layer 510 can also be removed by ion milling. If a hard mask (not shown) is used, that could be removed by ion milling. It should be pointed out, that this is only one possible method for forming the write pole 504. Other methods are possible as well, such as forming an electroplating mask with an opening configured to define the write pole shape 504 and then electroplating the write pole 504. Also, a damascene process could be employed wherein a magnetic material is electroplated into a trench formed in a substrate. After the write pole 504 has been defined, an etch stop layer 702 can be deposited. The etch stop layer 702 can be one or more materials such as Cr, Ru, NiCr or combinations of thereof. The thickness of the etch stop layer is preferably optimized to minimize the thickness of the etch stop layer 702 on the sides of the write pole 504 so as to provide optimal thermal conduction to the heat sink structure, as will be seen. Because of shadowing effects from the write pole structure 504, the thickness of the etch stop layer at the sides and bottom of the write pole 504 will be less than that over the substrate 502. Preferably, the etch stop layer 702 will be deposited to a nominal thickness of about 60 nm, which will result the etch stop layer 702 having a thickness of about 20 nm at the sides of the write pole 504.

Figure 8:
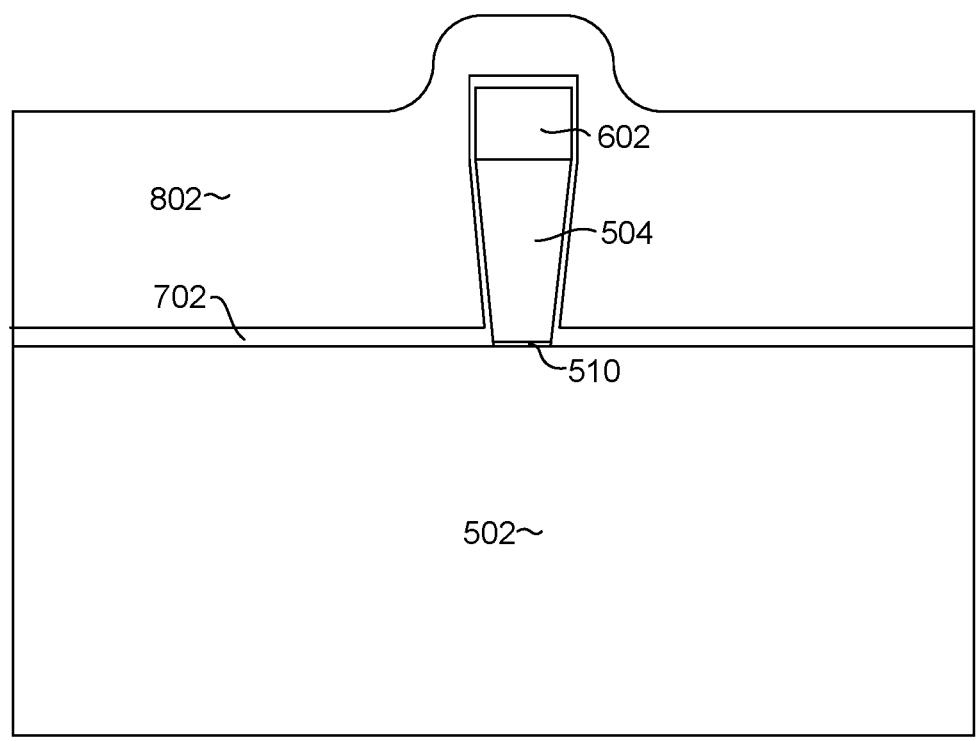
Figure 9:
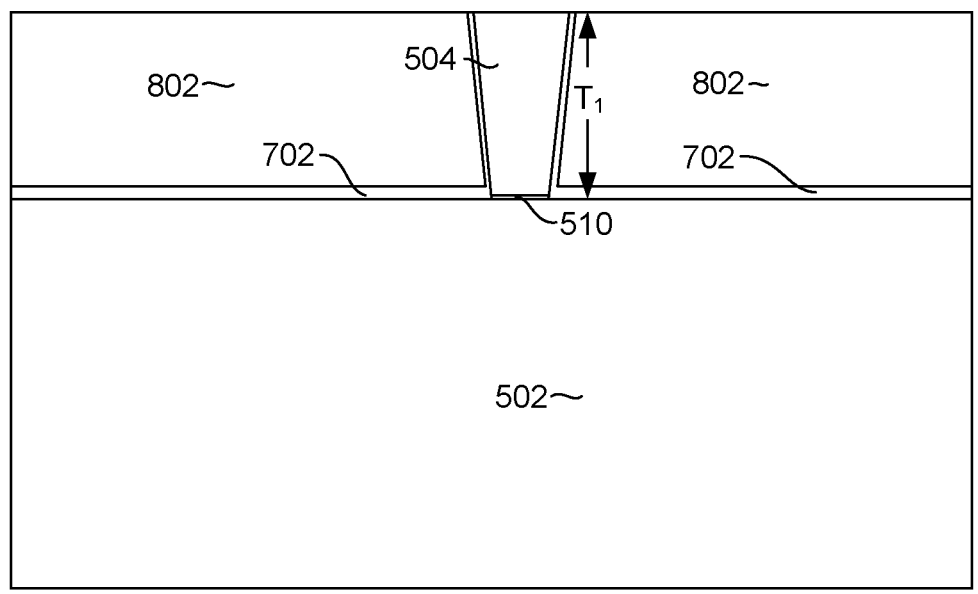

With reference now to FIG. 8, a fill material 802 is deposited. The fill material 802 is preferably alumina (Al₂O₃) and is deposited sufficiently thick to cover the write pole 504 and remaining mask 602. Then, a chemical mechanical polishing is performed. The chemical mechanical polishing (CMP) is performed sufficiently to remove any remaining mask material 602, exposing the write pole 504 and leaving a structure as shown in FIG. 9 with a planar upper surface. In one embodiment, this chemical mechanical polishing removes a portion of the write pole material leaving the write pole with a thickness $T_1$ in the vertical direction, but does not remove a sufficient amount to define a desired finished height of the write pole 504. This intermediate thickness $T_1$ can be 1.2 to 1.6 um. As will be seen, a later chemical mechanical polishing will further remove write pole material 504 to define the final write pole thickness (in the vertical direction).

Figure 10:
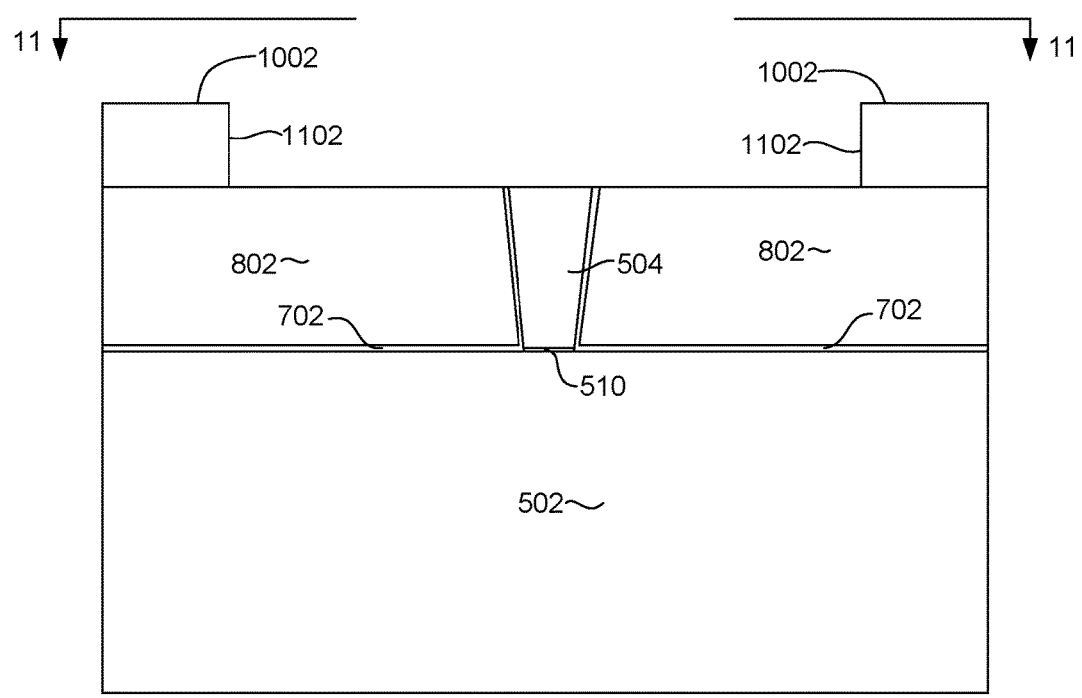
Figure 11:
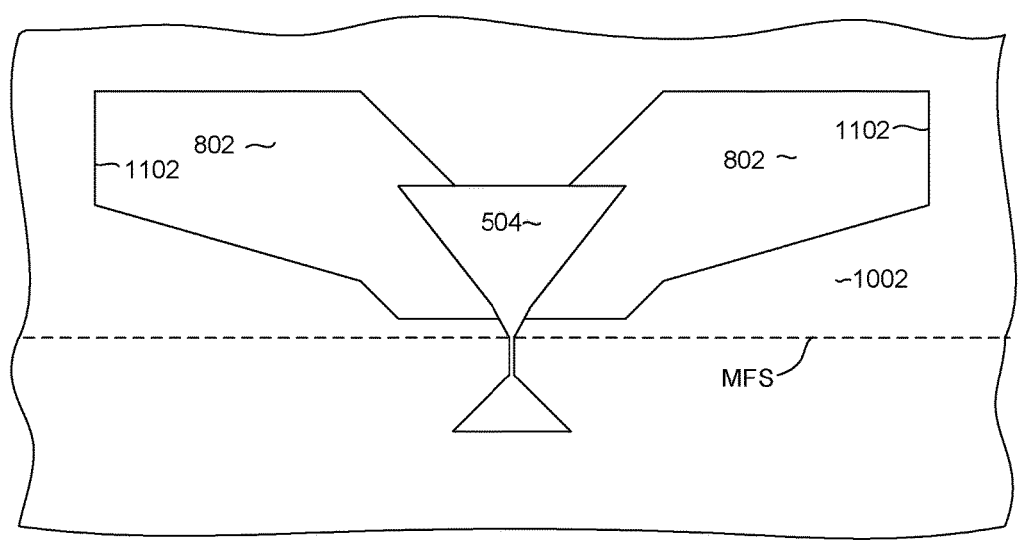

With reference now to FIGS. 10 and 11, a mask structure 1002 is formed over the write pole 504 and fill layer 802. FIG. 11 shows a top down view as seen from line 11-11 of FIG. 10. This mask can include a hard mask layer (not shown) such as Cr and/or NiCr. The hard mask would be deposited full film and a photoresist mask could be patterned over the hard mask. The pattern of the photoresist mask would then be transferred to the hard mask by ion milling and the photoresist mask could then be removed, leaving only the hard mask. The mask 1002 is has an opening 1102 that is configured to define the shape of a heat sink structure, such as the heat sink structure 302 shown in FIG. 4.

Figure 12:
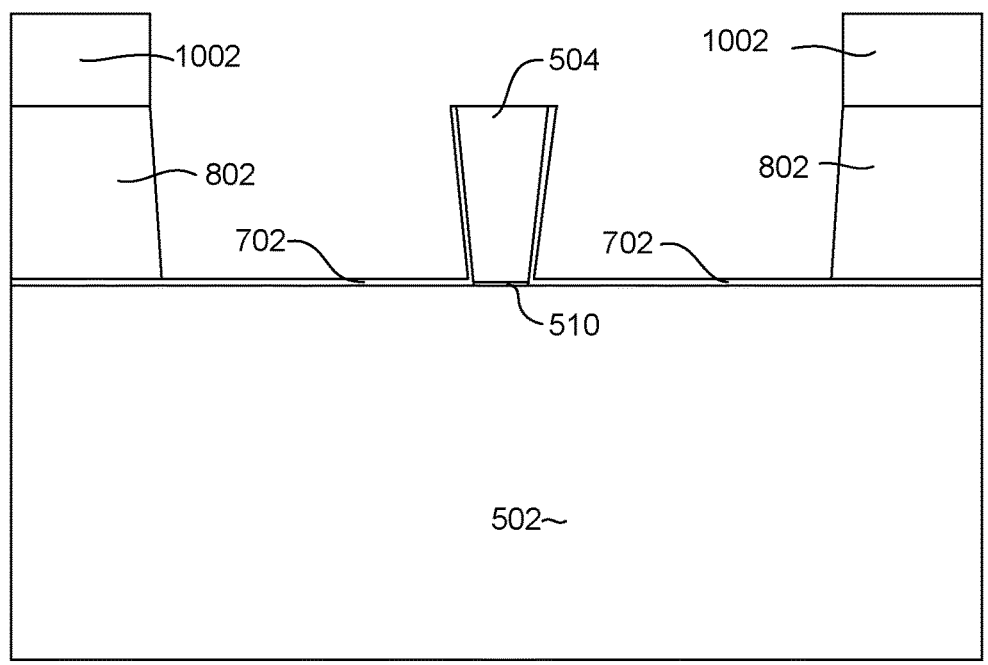
Figure 13:
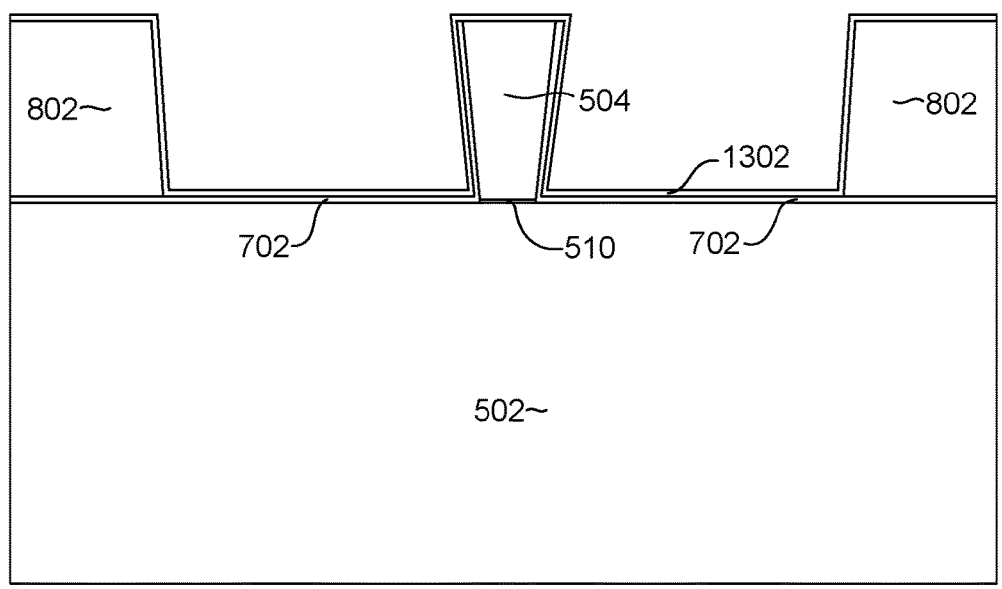

With reference to FIG. 12, a reactive ion etching is performed to remove portions of the fill layer 802 that are not protected by the mask 1002, forming a trench in the fill layer having the shape of the desired heat sink structure. The etching can be performed until the etch stop layer 702 is reached. If a hard mask (not shown) is used, this can be removed by ion milling. Then, with reference to FIG. 13, an electroplating seed layer 1302 is deposited, as performed in accordance with one embodiment. The electroplating seed layer 1302 is an electrically conductive material that can be deposited by a process such as sputter deposition. Preferably, the electroplating seed layer 1302 is a bi-layer of Cr and Au. The Cr layer can have a thickness of about 5 nm and the Au can have a thickness of about 25 nm.

Figure 14:
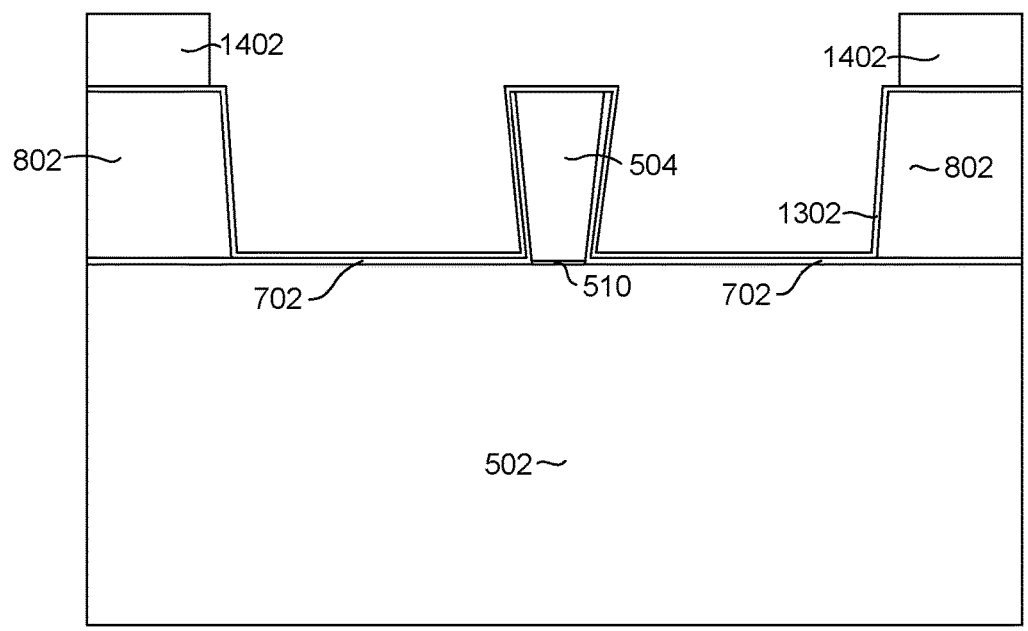

With reference now to FIG. 14, another mask structure 1402 is formed in accordance with one embodiment. The mask 1402 is an electroplating mask that has an opening that is just slightly larger than the trench formed by the previously described masking and etching process. This slightly larger size of the openings allows for misalignment of variation in the mask patterning, ensuring that the entire trench will be exposed by the opening in the mask 1402. The mask 1402 can be constructed of photoresist and can be about 4.0 um thick. Again, this mask 1402 can include a hard mask such as Cr and/or NiCr (not shown).

Figure 15:
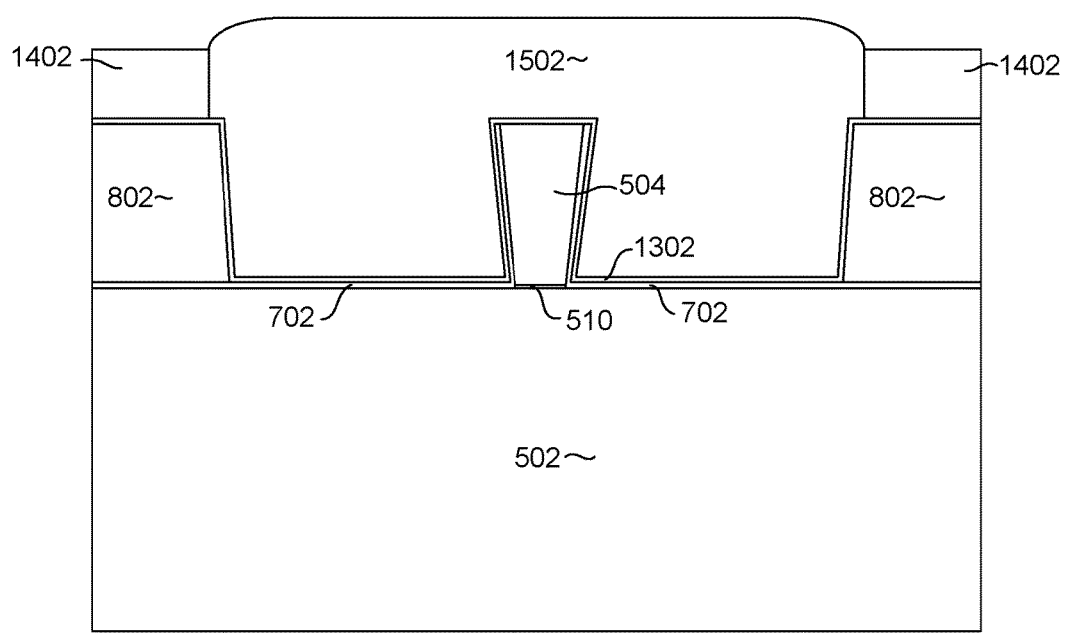
Figure 16:
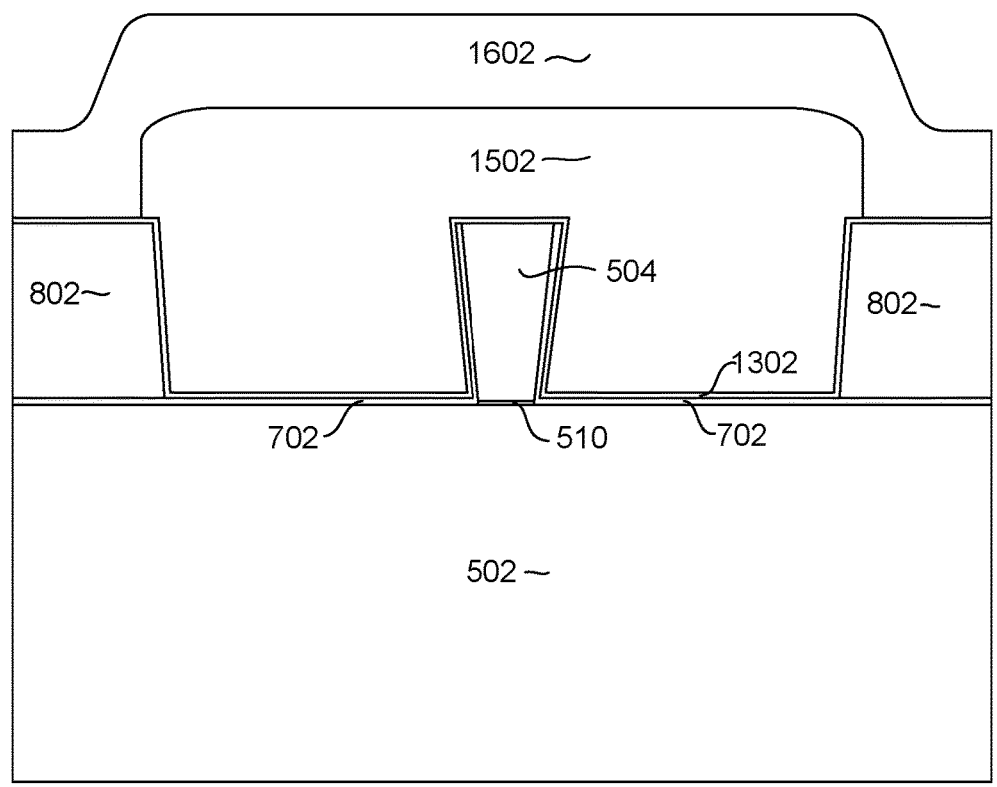

Then, with reference to FIG. 15, a heat sink material 1502 having a high thermal conductivity is electroplated into the opening in the mask 1402 and into the trench. The heat sink material 1502 is preferably Cu and is preferably electroplated to a thickness of about 1.8 um. After the heat sink material 1502 has been electroplated, the mask 1402 can be removed and another layer of fill material 1602 can be deposited, leaving a structure as shown in FIG. 16. The fill layer deposition is preferably an alumina deposition, which can be deposited to a thickness of about 1.5 um.

Figure 17:
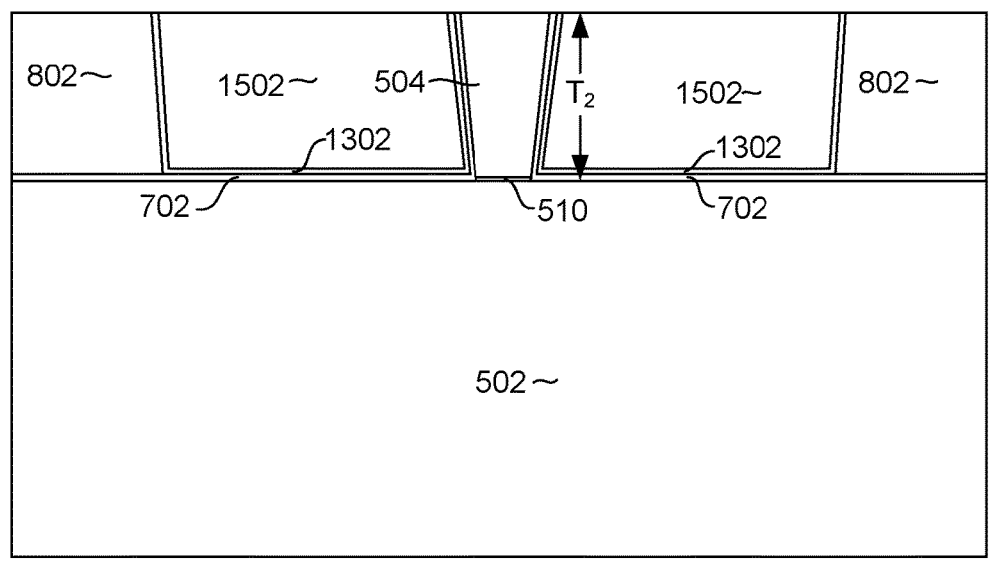

Another chemical mechanical polishing can then be performed, leaving a structure as shown in FIG. 17. The chemical mechanical polishing is performed sufficiently to expose the write pole 504. This chemical mechanical polishing is performed sufficiently to achieve a final desired thickness $T_2$ of the write pole 504 (in the vertical direction in FIG. 17). Preferably, this chemical mechanical polishing is performed to achieve a write pole having a thickness $T_2$ of 0.9 to 1.3 um.

The above described process forms a heat sink structure without forming voids at the media facing surface (MFS). Because the write pole is planarized by chemical mechanical polishing before plating of the heat sink structure, the heat sink structure does not have to be formed over the tall topography of the as plated write pole. Also, depositing the final fill layer over the previously planarized heat sink structure further prevents the formation of voids in the fill material at the media facing surface.

Figure 18:
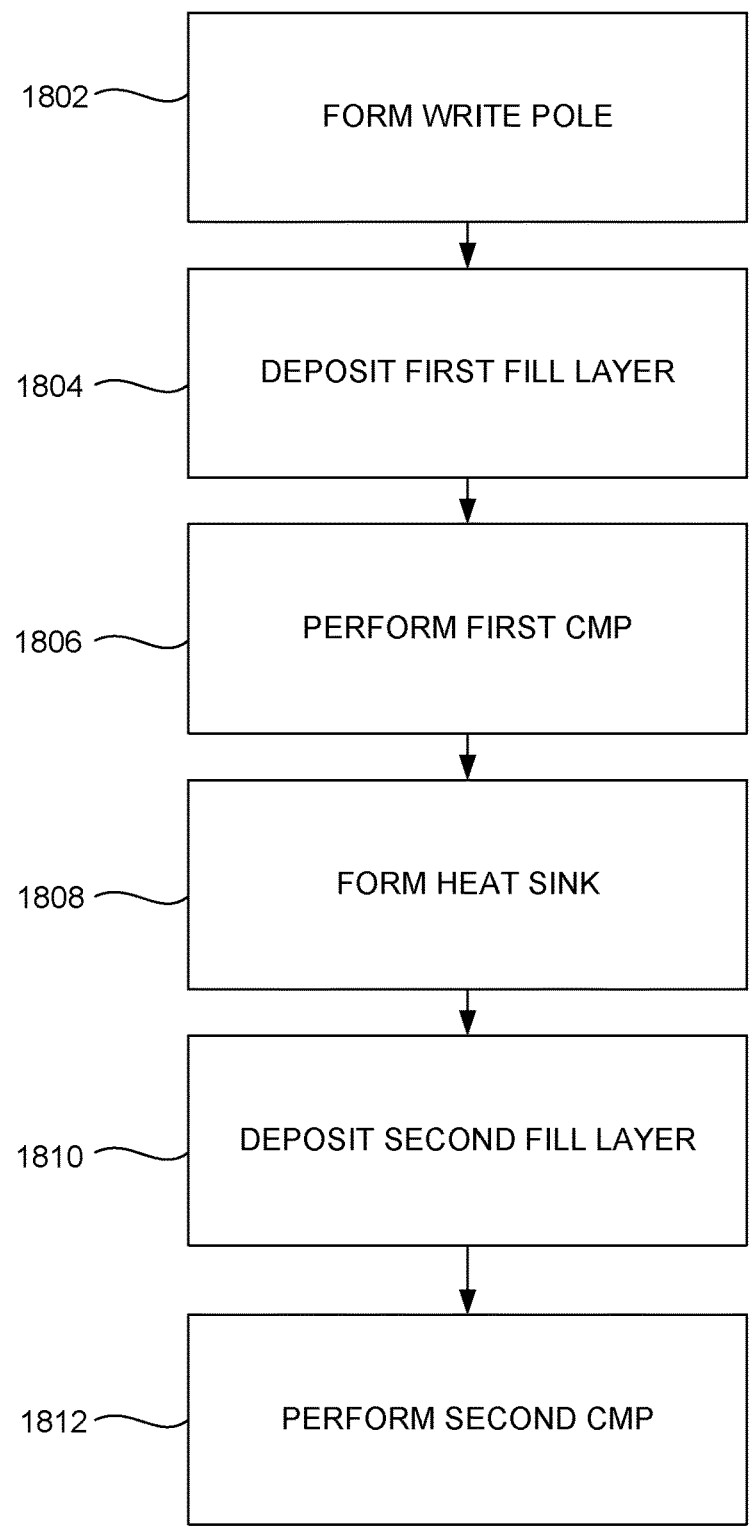
FIG. 18 is a flowchart summarizing a method of manufacturing a magnetic write head according to one embodiment.

The above described process for forming a magnetic write head can be summarized with reference to the flowchart illustrated in FIG. 18, which summarizes the process according to various embodiments. In certain embodiments, certain depicted steps may be omitted, altered or combined, or additional steps may be performed in addition to the ones shown, according to the variations described throughout this disclosure. For example, one or more steps 1804 and 1810 may be omitted in certain embodiments. The process begins with a step 1802 of forming a magnetic write pole. As described above, the write pole can be formed by depositing a magnetic material and masking and etching the magnetic material to form a write pole.

Then, in a step 1804, a first fill layer such as alumina is deposited. Then, in a step 1806 a first chemical mechanical polishing (CMP) is performed. The first CMP is performed sufficiently to reduce the thickness of the write pole to a first or intermediate thickness. Then, in a step 1808 a heat sink is formed. The heat sink can be formed by defining a trench in the first fill layer and electroplating a thermally conductive material such as Cu into the trench. Then, in a step 1810 a second fill layer, such as alumina, is deposited, and in a step 1812 a second chemical mechanical polishing (CMP) is performed. The second CMP is performed to further reduce the thickness of the write pole to a second, thickness that is a final thickness of the write pole.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A method comprising:
    forming a magnetic write pole over a substrate having first and second sides;
    depositing an etch stop layer on the magnetic write pole and a remaining surface of the substrate, wherein a thickness of the etch stop layer on the first and second sides of the magnetic write pole is less than the thickness of the etch stop layer on the remaining surface of the substrate;
    depositing a non-magnetic fill layer over the etch stop layer;
    forming a trench in the non-magnetic fill layer adjacent to the first and second sides of the magnetic write pole;
    depositing an electrically conductive seed layer on walls of the trench and a top surface of the magnetic write pole; and
    filling a non-magnetic heat sink material in the trench over the walls of the trench and extending over the top surface of the magnetic write pole.

2. The method as in claim 1 wherein the forming of the trench does not remove the etch stop layer from the first and second sides of the magnetic write pole and the remaining surface of the substrate, and wherein the electrically conductive seed layer is deposited over the etch stop layer.

3. The method as in claim 1, further comprising performing a first chemical mechanical polishing process to remove the non-magnetic fill layer and the etch stop layer from the top surface of the magnetic write pole.

4. The method as in claim 3, wherein the first chemical mechanical polishing reduces a thickness of the magnetic write pole to a first thickness.

5. The method as in claim 3, further comprising performing a second chemical mechanical polishing process to remove the electrically conductive seed layer and the non-magnetic heat sink material from the top surface of the magnetic write pole, wherein the second chemical mechanical polishing process reduces a thickness of the magnetic write pole to a second thickness that is a final write pole thickness.

6. The method as in claim 4, wherein the first chemical mechanical polishing process reduces the thickness of the magnetic write pole to about 1.2 to 1.6 um, and a second chemical mechanical polishing process reduces the thickness of the magnetic write pole to about 0.9 to 1.3 um.

7. The method as in claim 1, further comprising depositing a second non-magnetic fill material over the non-magnetic heat sink material.

8. The method as in claim 1, wherein the non-magnetic heat sink material is recessed from a media facing surface of a magnetic write head.

9. The method as in claim 1, wherein the non-magnetic fill layer comprises alumina.

10. The method as in claim 1, further comprising depositing a seed layer between the substrate and the magnetic write pole.

11. The method as in claim 1 wherein the non-magnetic heat sink material comprises Cu.

12. A method for manufacturing a magnetic write head, comprising:
    forming a magnetic write pole having a first thickness;
    depositing an etch stop layer on the magnetic write pole and a remaining surface of a substrate on which the magnetic write pole is formed, wherein a thickness of the etch stop layer on first and second sides of the magnetic write pole is less than the thickness of the etch stop layer on the remaining surface of the substrate;
    depositing a non-magnetic fill layer over the etch stop layer;
    forming a trench in the non-magnetic fill layer adjacent to the first and second sides of the magnetic write pole and reducing the first thickness of the magnetic write pole to a second thickness;
    depositing an electrically conductive seed layer on walls of the trench and a top surface of the magnetic write pole;
    forming a heat sink structure by filling a non-magnetic heat sink material in the trench over the walls and extending over the top surface of the magnetic write pole; and
    removing a portion of the non-magnetic heat sink material for reducing the second thickness of the magnetic write pole to a third thickness.

13. The method as in claim 12, wherein the magnetic write pole is formed by electroplating.

14. The method as in claim 12, further comprising depositing a second non-magnetic fill layer over the heat sink material.

15. The method as in claim 12 wherein the non-magnetic fill layer comprises alumina.

16. The method as in claim 12, further comprising:
    depositing a seed layer on the substrate;
    depositing a first magnetic layer on the seed layer; and depositing a second magnetic layer on the first magnetic layer, wherein the first magnetic layer and the second magnetic layer form the magnetic write pole.

17. The method as in claim 14, wherein the second non-magnetic fill layer comprises alumina.

18. The method as in claim 12, wherein the second thickness is 0.9 um to 1.3 um.

19. The method as in claim 12 wherein the first thickness is 1.2 to 1.6 um, and the second thickness is 0.9 to 1.3 um.

* * * * *